Patented June 8, 1943

2,321,094

UNITED STATES PATENT OFFICE 2,321,094

TETRAACETALS OF GLYOXAL WITH GLYCOL MONOETHERS AND PROCESS OF MAKING THEM

Louis G. MacDowell, Charleston, and Raymond W. McNamee, South Charleston, W. Va., assignors to Carbide and Carbon Chemicals Corporation, a corporation of New York No Drawing. Application March 18, 1941,
Serial No. 383,928

11 Claims. (Cl. 260—615)

This invention relates to glyoxal tetra-acetals of glycol mono-ethers, comprising both monoglycol and polyglycol mono-ethers, and it includes processes of making these compounds.

The glyoxal tetra-acetals to which this invention pertains may be represented by the following formula:

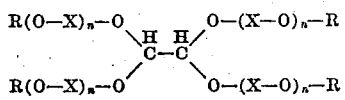

where X is an alkylene group having at least two carbon atoms, $n$ is a small integer, and R is an alkyl, aralkyl, or aryl group. More specifically, the following monoglycol and polyglycol mono-ethers are representative of those suitable in forming the new glyoxal tetra-acetals: the methyl, ethyl, propyl, isopropyl, butyl, 2-ethylbutyl, 2-ethylhexyl, benzyl, phenyl, and toluyl, mono-ethers of ethylene, propylene and butylene glycols and the corresponding mono-ethers of the di-, tri-, or tetra polyglycol modifications of these glycols.

The new compounds are unique in that they contain a very high proportion of oxygen bound in ether linkages, and they are powerful solvents for oils, fats, resins and cellulose derivatives. They may be employed in processes for the extraction of essential oils, as well as alkaloids, and in methods for the removal of wax from hydrocarbons. Lower alkoxyalkyl tetra-acetals of glyoxal, such as glyoxal tetra(methoxyethyl) acetal, are soluble both in water and in most classes of organic liquids, and they may act as a strong mutual solvent or coupling agent to bring into solution mutually immiscible liquids or to improve the stability of an emulsion of one such liquid in another. The higher alkoxyalkyl tetra-acetals of glyoxal are insoluble in water and they are excellent plasticizers for cellulose derivatives, for polyvinyl acetal resins, and for casein. Certain of the aromatic derivatives have mild fragrant odors and are useful in perfumery.

While in some instances, it may be possible to make the glyoxal tetra-acetals of the monoglycol and polyglycol mono-ethers by known reactions, such as those involving the use of glyoxal sulphate, we have discovered an efficient method of making these products directly from glyoxal and the glycol mono-ethers. The method of this invention involves heating the glyoxal and glycol mono-ether, preferably in the presence of a small amount of an acidic catalyst, and continuously removing the water of reaction as it is formed. Suitable acidic catalysts include mineral acids, such as hydrochloric and sulfuric acids, as well as mineral acid salts, such as aluminum sulfate or boron trifluoride. Because of the difficulty in handling and storing monomeric glyoxal, the glyoxal preferably is added in aqueous solution where it exists either in the form of a hydrate or a hydrated polymer, possibly tetrahydroxydioxane. Thus, the substances employed in this invention to react with glycol mono-ethers to form glyoxal tetra-acetals consist of aqueous glyoxal, as well as monomeric glyoxal, its hydrates, polymers, and hydrated polymers. The invention contemplates the removal of any water initially present as well as that formed in the reaction.

The amount of glycol mono-ether employed in the acetal reaction is preferably more than that stoichiometrically required. Where the glycol mono-ether is water-immiscible, this may provide a convenient method for the removal of the water of reaction wherein a constant boiling mixture of water and the glycol mono-ether is continuously distilled and the glycol mono-ether separated from the distillate and returned to the reaction. Carrying out the process under reduced pressure will also facilitate removal of the water, especially when the acetal formed is that of a high boiling glycol ether. Irrespective of the solubility in water of the glycol ether involved, the process may be carried out advantageously in the presence of a volatile, inert, water-immiscible liquid, such as benzene, toluene, xylene, hexane, ethylene dichloride, or isopropyl ether, and the water of reaction can be removed as an azeotropic distillate with this liquid. This procedure has the advantage of permitting the use of lower reaction temperatures, thus retarding the formation of by-products. The temperatures required may vary from but slightly elevated temperatures, if low boiling dehydrating agents are employed, such as ethyl ether, up to temperatures near the boiling point range of the glyoxal tetra-acetal formed.

The following examples will illustrate the practice of the invention:

*Example 1.*—Four hundred and fifty-five (455) grams of a 51% aqueous glyoxal solution (containing 4 mols of glyoxal), 2,432 grams (32 mols) of the methyl ether of ethylene glycol, and 3 cc. of concentrated sulfuric acid were heated in a distillation kettle. The water evolved in the reaction, as well as that initially present, was removed continuously by straight distillation. At the completion of the reaction, that is, when all the water had distilled over, sodium acetate was added to neutralize the catalyst and the excess glycol ether was removed by straight distillation. A 63.4% yield of the tetra (methoxy-ethyl) acetal of glyoxal was obtained. This material boils at 183° to 185° C. at 5 mm. and possesses the specific gravity of 1.068 at 20° C. It is completely miscible with water and all common organic solvents.

*Example 2.*—Thirty-six and two-tenths (36.2) grams of an 80% aqueous glyoxal solution (containing 0.5 mol of glyoxal), 472 grams of the monobutyl ether of ethylene glycol (4 mols), 0.6 cc. of concentrated sulfuric acid, and 200 cc. of toluene were heated together in a distillation kettle. A constant boiling mixture of water and toluene was distilled over, condensed, and collected in a decanter from which the water layer was removed and the toluene layer returned to the still column as reflux. After about 24 grams of water had been removed, the excess of toluene was distilled off. An 86.2% yield of glyoxal tetra (butoxy-ethyl) acetal was obtained. The major portion of this material boiled at 240° to 250° C. at 4 mm. and possessed a specific gravity of 0.961 at 20° C. It was insoluble in water, sparingly soluble in methanol and completely soluble in all other common organic solvents and in mineral oil.

Modifications of the invention other than those disclosed will be readily apparent to those skilled in the art and are intended to be included within the invention as defined by the appended claims.

We claim:
1. Glyoxal tetra-acetals of glycol mono-ethers.
2. Glyoxal tetra-acetals of glycol mono-alkyl ethers.
3. Glyoxal tetra-acetals of monoglycol mono-alkyl ethers.
4. Glyoxal tetra-acetals of polyglycol mono-alkyl ethers.
5. Glyoxal tetra-acetals of ethylene glycol mono-alkyl ethers.
6. Glyoxal tetra (methoxy-ethyl) acetal.
7. Glyoxal tetra (butoxy-ethyl) acetal.
8. Process of making glyoxal tetra-acetals of glycol mono-ethers which comprises heating one of the group consisting of aqueous glyoxal, monomeric glyoxal and the hydrates, polymers and hydrated polymers of glyoxal with a glycol mono-ether and progressively removing the water formed in the reaction.
9. Process of making glyoxal tetra-acetals of glycol mono-ethers which comprises heating an aqueous solution of glyoxal with a glycol mono-ether, removing the water initially present and progressively removing the water formed in the reaction.
10. Process of making glyoxal tetra-acetals of ethylene glycol mono-alkyl ethers which comprises heating an aqueous solution of glyoxal with an ethylene glycol mono-alkyl ether, removing the water initially present and progressively removing the water formed in the reaction, and recovering said glyoxal tetra-acetal from the reaction mixture.
11. Process of making a glyoxal tetra-acetal of an ethylene glycol mono-alkyl ether which comprises heating one of the group consisting of aqueous glyoxal, monomeric glyoxal and the hydrates, polymers and hydrated polymers of glyoxal with an ethylene glycol mono-alkyl ether in the presence of a small amount of an acidic catalyst and in the presence of an inert, volatile water-immiscible liquid, progressively removing the water formed in the reaction as a constant boiling mixture with said liquid, and recovering said glyoxal tetra-acetal from the reaction mixture.

LOUIS G. MacDOWELL.
RAYMOND W. McNAMEE.